United States Patent
Liu et al.

(10) Patent No.: US 6,687,094 B2
(45) Date of Patent: Feb. 3, 2004

(54) HEAD ACTUATOR FOR A DATA STORAGE HEAD HAVING A LOW MASS WITH LATERAL STIFFNESS

(75) Inventors: Xiong Liu, Singapore (SG); Shri Hari Narayan, Minneapolis, MN (US); Michael Joo Chiang Toh, Singapore (SG); Choonkiat Lim, Singapore (SG); ChorShan Cheng, Singapore (SG)

(73) Assignee: Seagate Technology LLC, Scots Valley, CA (US)

( * ) Notice: Subject to any disclaimer, the term of this patent is extended or adjusted under 35 U.S.C. 154(b) by 64 days.

(21) Appl. No.: 09/897,702

(22) Filed: Jun. 29, 2001

(65) Prior Publication Data

US 2002/0064000 A1 May 30, 2002

Related U.S. Application Data

(60) Provisional application No. 60/253,183, filed on Nov. 27, 2000.

(51) Int. Cl.[7] .................................................. G11B 5/55
(52) U.S. Cl. ..................... 360/265.7; 360/266
(58) Field of Search ........................ 360/265.7, 265.9, 360/266

(56) References Cited

U.S. PATENT DOCUMENTS

| 3,812,535 | A | | 5/1974 | Higgins et al. ............. 360/103 |
|---|---|---|---|---|
| 4,764,831 | A | * | 8/1988 | Patel ....................... 360/265.7 |
| 4,797,763 | A | | 1/1989 | Levy et al. ................. 360/104 |
| 5,526,205 | A | | 6/1996 | Aoyagi et al. .............. 360/104 |
| 5,570,261 | A | | 10/1996 | Frater et al. ................ 360/104 |
| 5,731,931 | A | | 3/1998 | Goss .......................... 360/104 |
| 5,734,526 | A | | 3/1998 | Symons ...................... 360/104 |
| 5,835,311 | A | * | 11/1998 | Brooks .................... 360/265.9 |
| 5,894,655 | A | | 4/1999 | Symons ................... 29/603.03 |
| 6,014,289 | A | | 1/2000 | Goss .......................... 360/104 |

* cited by examiner

Primary Examiner—A. J. Heinz
(74) Attorney, Agent, or Firm—Westman, Champlin and Kelly, P.A.

(57) ABSTRACT

An actuator having a relatively low mass for supporting flexible head suspension assemblies to read data from or write data to discs. The actuator includes an actuator body adapted to rotationally coupled to a base chassis of the disc drive and a yoke assembly including yoke arms extending from the actuator body. The actuator includes at least one rigid actuator arm rigidly supporting the flexible head suspension assemblies. The rigid actuator arm includes multiple arm plates supported in spaced relation to provide a thickness of the actuator arm for lateral stiffness.

24 Claims, 11 Drawing Sheets

FIG. 16

HEAD ACTUATOR FOR A DATA STORAGE HEAD HAVING A LOW MASS WITH LATERAL STIFFNESS

CROSS-REFERENCE TO RELATED APPLICATION

This application claims priority to Provisional Application Serial No. 60/253,183, filed Nov. 27, 2000 and entitled "BOX ACTUATOR FOR HARD DISC DRIVE".

FIELD OF THE INVENTION

The present invention relates to data storage systems. In particular, the present invention relates to an actuator for supporting heads for a data storage system.

BACKGROUND OF THE INVENTION

Data storage devices store digital information on discs. Heads are supported relative to disc surfaces to read data from or write data to the discs. Data is stored on concentric data tracks of the discs. For operation, an actuator block movably supports heads via a head suspension interface to move heads between concentric data tracks on the discs. Actuator blocks are typically formed of a solid body having a plurality of actuator arms extending therefrom to support multiple flexible suspension assemblies having heads coupled thereto to read data from or write data to discs of a disc stack.

For operation, the actuator block is rotated to move heads relative to the disc surface. To initiate rotation of the actuator block for head placement sufficient power must be supplied to overcome the inertia of the static system. Power requirements for operation are generally proportional to the mass of the assembly. Typical actuator block structures are formed of a relatively light aluminum material to reduce the assembly mass for operation of the actuator assembly for head components of the assembly or actuator arms supporting the heads. Vibration of the actuator arms or assembly can introduce off-track movement to the supported heads degrading read-write operations. A real disc drive density is increasing demanding precision head placement and data storage applications are demanding lower operating power requirements. The present invention addresses these and other problems and offers solutions not previously recognized nor appreciated.

SUMMARY OF THE INVENTION

An actuator for supporting flexible head suspension assemblies to read data from or write data to discs. In one embodiment, the actuator includes an actuator body adapted to rotationally coupled to a base chassis of a disc drive and a yoke assembly including yoke arms extending from the actuator body. The actuator includes at least one rigid actuator arm rigidly supporting the flexible head suspension assemblies. The rigid actuator arm includes multiple arm plates supported in spaced relation to form a low mass assembly having sufficient arm thickness for lateral stiffness. These and other features and benefits will become apparent upon review of the attached figures and the accompanying specification.

DETAILED DESCRIPTION OF ILLUSTRATIVE EMBODIMENTS

Figure 1:
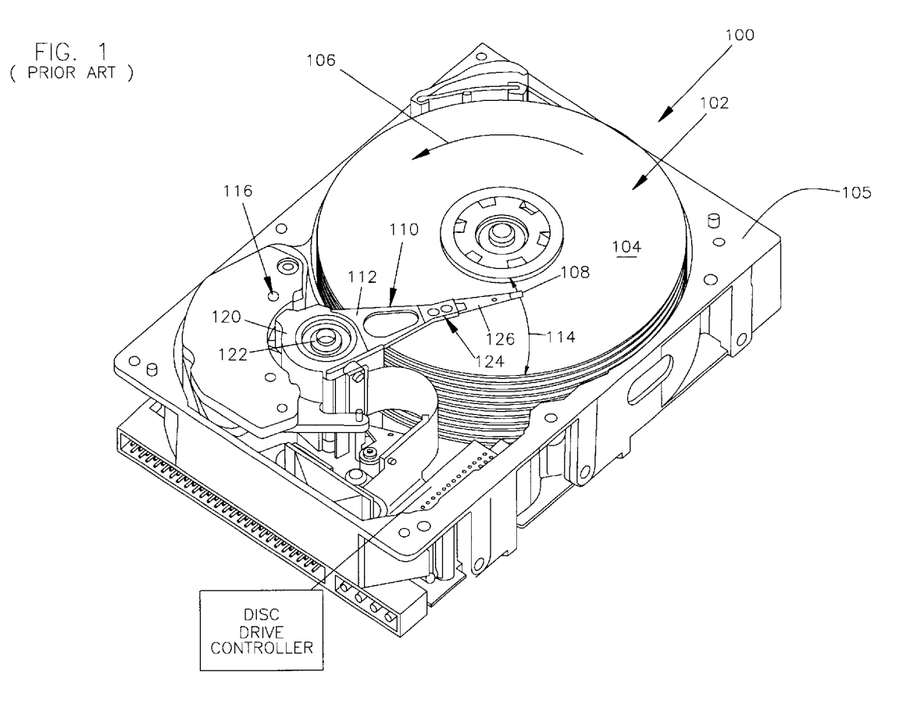
FIG. 1 is a perspective illustration of a disc drive assembly.

FIG. 1 illustrates a data storage device 100 having a disc stack 102 including a plurality of discs 104 rotationally supported on a base chassis 105 as illustrated by arrow 106. Heads 108 are supported relative to surfaces of discs 104 for read and/or write operations. As shown, heads 108 are movably supported relative to discs 104 by an actuator assembly 110. Actuator assembly 110 includes an actuator block 112 rotationally coupled relative to the base chassis 105 as illustrated by arrow 114. Actuator block 112 rotates by operation of a voice coil motor 116 to move heads 108 between selected data tracks of discs 104 in the disc stack 102.

Figure 2:
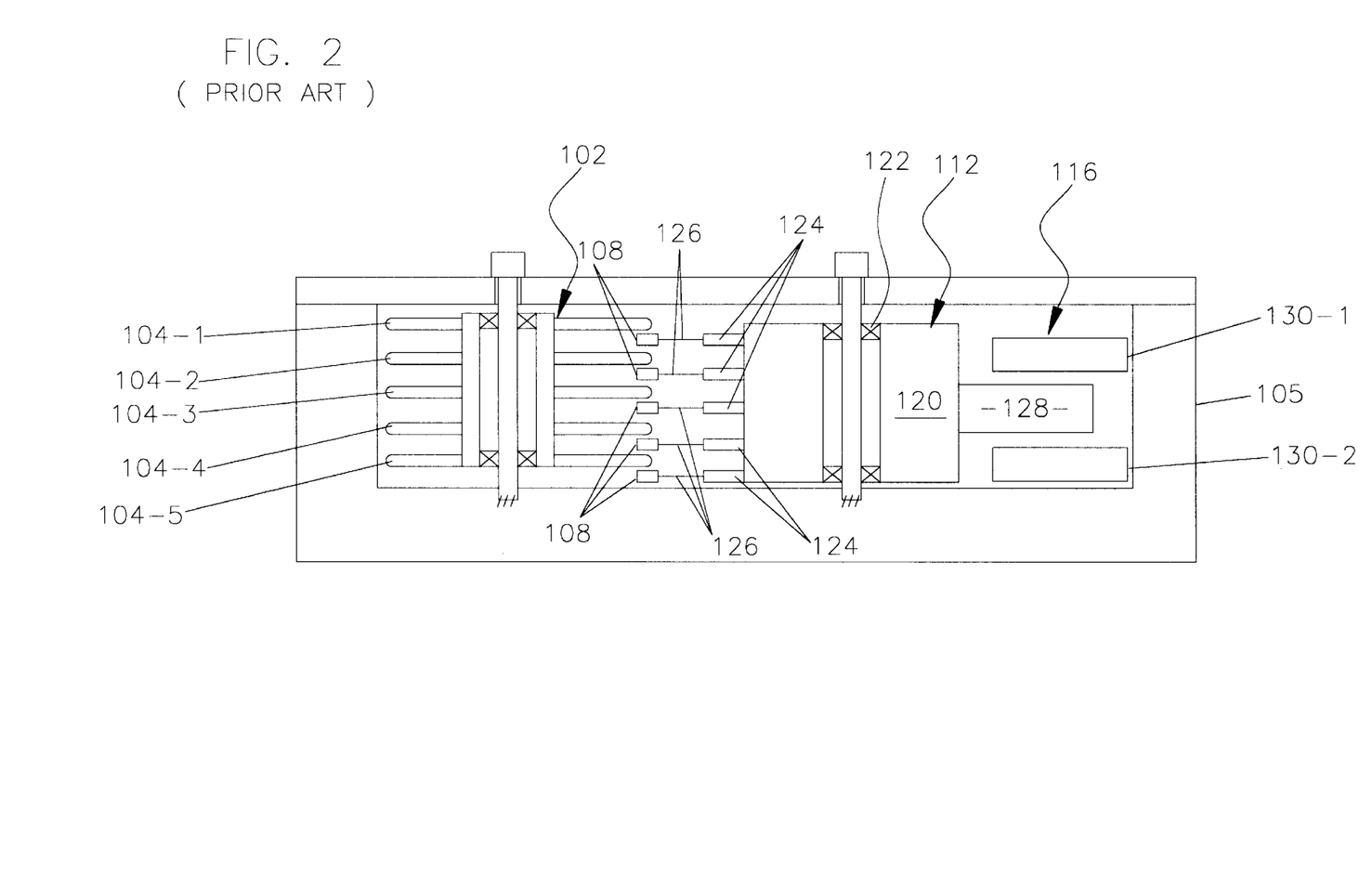
FIG. 2 is schematic illustration of a disc stack and operating components of the disc drive of FIG. 1.

As shown in FIGS. 1–2, actuator block 112 includes an actuator body 120 which is rotationally coupled relative to the base chassis 104 via a bearing assembly 122 illustrated diagrammatically in FIG. 2. A plurality of relatively rigid stacked actuator arms 124 extend from the actuator body 120 to rigidly support head suspension assemblies 126 for read or write operations. Head suspension assemblies 126 flexibly support heads 108 relative to the disc surface. Typically, the suspension assembly 126 includes a load beam to bias the head toward the disc surface and a gimbal spring to allow the head to pitch and roll relative to the disc surface. Typically, the suspension assembly is sufficiently vertically flexible for load/unload operations for contact starts and stops (CSS) and is sufficiently flexible to maintain the position of the head relative to the disc surface for proper head-disc spacing during operation.

Figure 3:
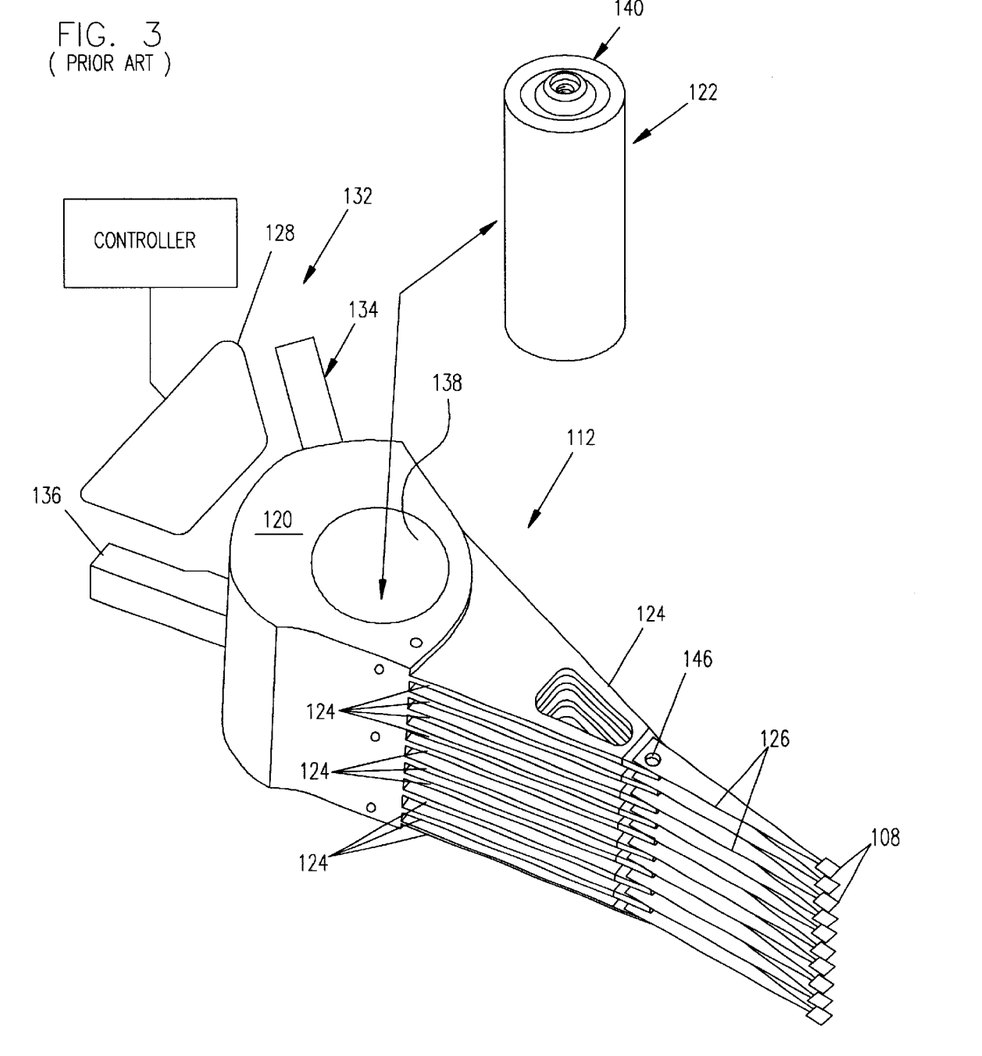
FIG. 3 is a perspective illustration of a prior art actuator block assembly.

As previously described, actuator block 112 is powered by voice coil motor 116 which includes voice coil 128 coupled to actuator block 112 (illustrated diagrammatically in FIG. 2) and operable in a magnetic field formed by permanent magnets 130-1, 130-2. As shown in FIG. 3, voice coil 128 is supported by a yoke assembly 132 including yoke arms 134, 136 extending from actuator body 120. In the embodiment shown in FIG. 3, actuator body 120 includes a bore 138 for insertion of a bearing cartridge 140 forming the bearing assembly 122 to rotationally couple actuator block 112 relative to chassis 105 to rotationally support the actuator block 112 for read-write operations.

Figure 4:
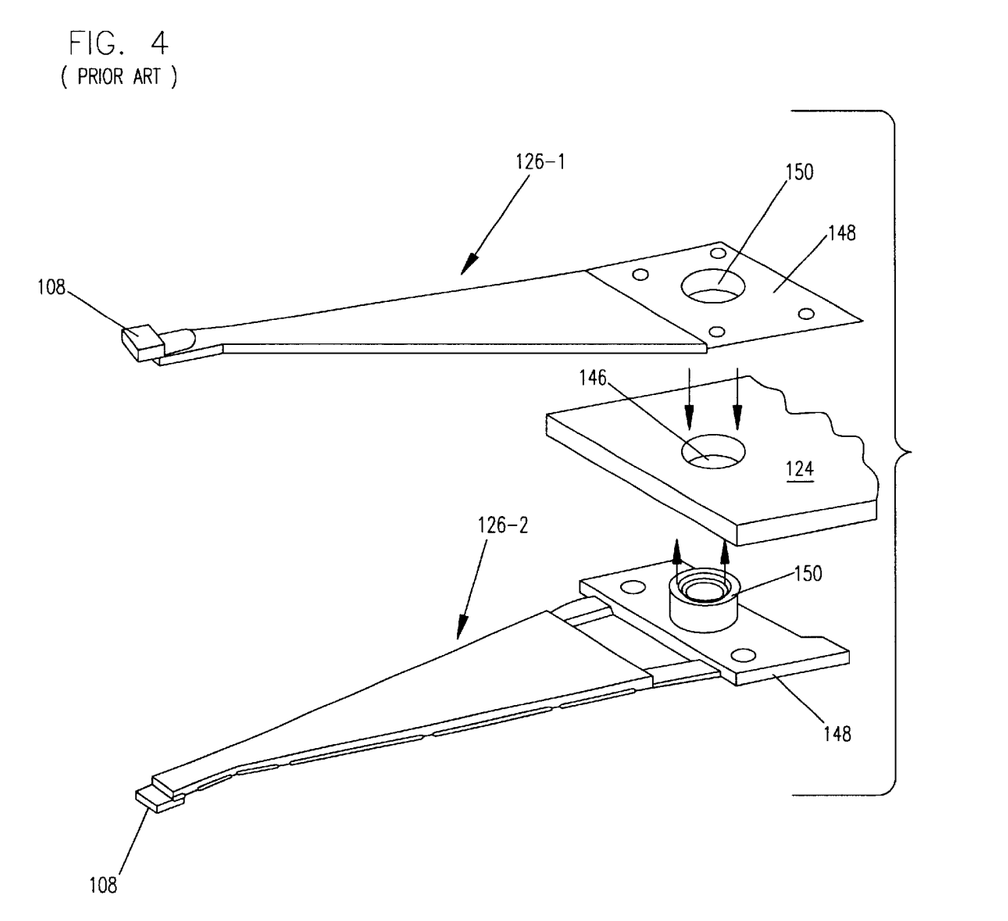
FIG. 4 is detailed illustration of head suspension assemblies staked to an actuator arm of an actuator assembly.
Figure 5:
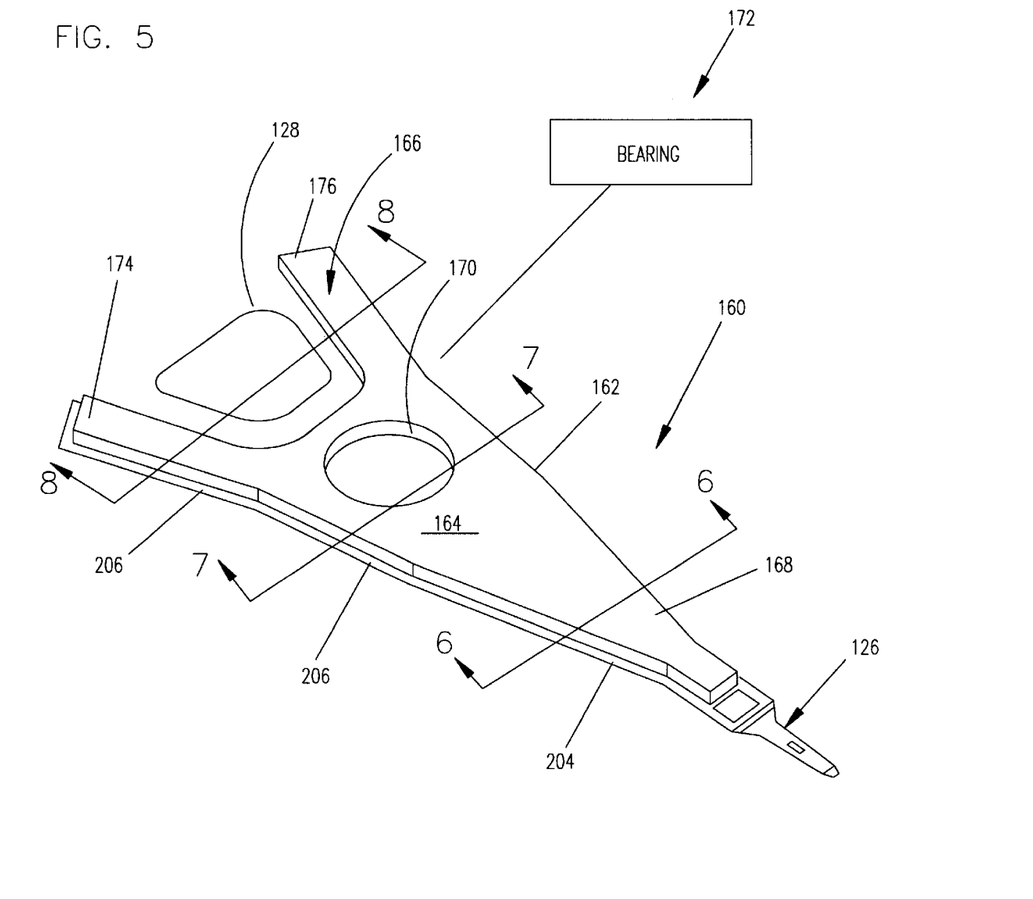
FIG. 5 is a perspective illustration of an actuator assembly embodiment including multiple structural layers.

As shown in FIGS. 3–4, head suspension assembly 126 are staked to actuator arms 124 at stake openings 146 on a cantilevered end of the actuator arm 124 by known swaging techniques. As shown in FIG. 4, head suspension assemblies 126 include a mounting plate 148 having a tubular stake 150 which is inserted into stake opening 146 on actuator arms 124 to connect head suspension assemblies 126 to actuator arms 124. In the embodiment shown in FIG. 4, upper and lower suspension assemblies 126-1, 126-2 are staked to a single actuator arm 124 to read data from or write data to a dual sided disc.

Typically the yoke arms 134, 136, actuator body 120 and arms 124 of actuator block 112 are formed of an integrated solid structure constructed of a light weight material, such as aluminum, to provide a relatively light or low actuator mass supporting the head suspension assemblies for read-write operations. New data storage applications demand lower power consumption and faster seek and access speeds. Prior actuator block assemblies and technology limit speed and power optimization. The present invention relates to an actuator for supporting heads which provides a low mass structure with desired stiffness and resonance mode frequencies to movably support head suspension assemblies for read write operations.

FIGS. 5–8 illustrate an embodiment of an actuator assembly 160 of the present invention. As shown, actuator assembly 160 includes an actuator 162 having an actuator body 164, yoke assembly 166 and an actuator arm 168. As shown, actuator body 164 includes a bearing bore 170 for a bearing assembly 172, as illustrated diagrammatically, to rotationally couple actuator 162 relative to the drive chassis 105 as shown in FIG. 1. Yoke assembly 166 includes yoke arms 174, 176 which extend from the actuator body 164 to support voice coil 128 (illustrated diagrammatically) for operation of the voice coil motor as previously described. Actuator arm 168 extends from actuator body 164 to form a rigid arm structure to rigidly support head suspension assemblies 126 for read-write operations.

Figure 6:
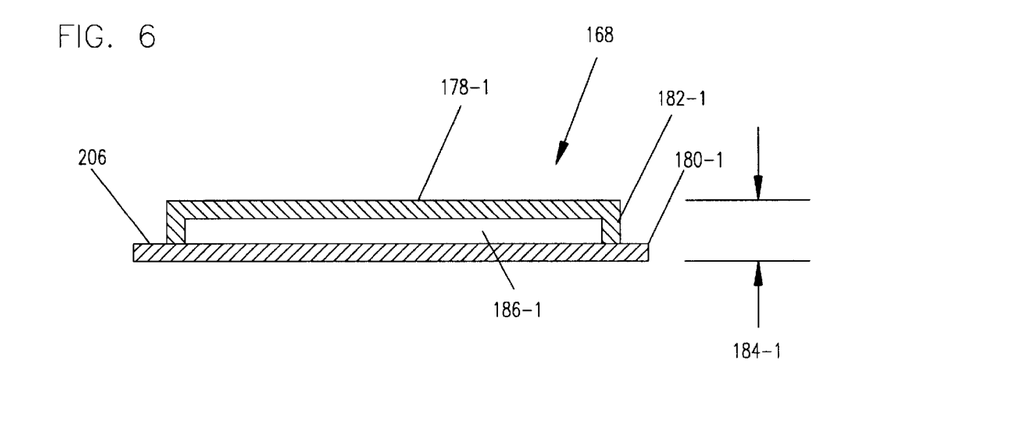
FIG. 6 is a cross-sectional view taken along line 6—6 of FIG. 5.
Figure 7:
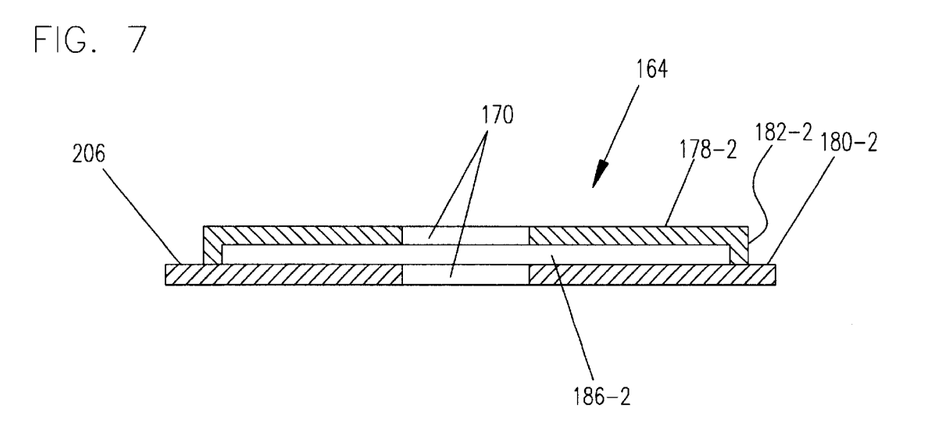
FIG. 7 is a cross-sectional view taken along line 7—7 of FIG. 5.
Figure 8:
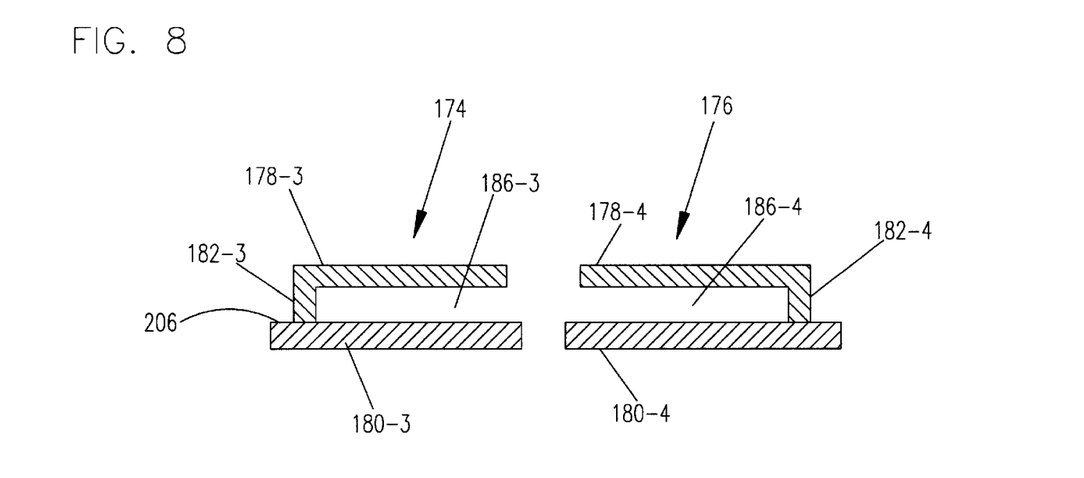
FIG. 8 is a cross-sectional view taken along line 8—8 of FIG. 5.

As illustrated in FIG. 6, actuator arm 168 is formed of multiple structural layers or arm plates 178-1, 180-1 supported in spaced relation via an interface support 182-1 to form a separation between arm plates 178-1, 180-1 defining a thickness 184-1 of the actuator arm 168. The thickness 184-1 is optimized to provide desired stiffnless and resonance mode frequencies for excitation of the actuator arm 168. As shown, interface 182-1 supports arm plates 178-1, 180-1 in spaced relation to form a hollow space 186-1 between arm plates 178-1, 180-1. Hollow space 186-1 reduces the weight of the arm 168 to reduce the moving mass of the arm 168. As shown in FIG. 7, actuator body 164 is formed of multiple body plates 178-2, 180-2 supported in spaced relation via interface 182-2. As shown, spaced body plates 178-2, 180-2 form a hollow space 186-2 to provide a low mass actuator body 164. Similarly as shown in FIG. 8, yoke arms 174, 176 are formed of multiple yoke plates 178-3, 178-4, 180-3, 180-4 supported in spaced relation via interfaces 182-3, 182-4 and in the embodiment shown, form spaces 186-3, 186-4 to provide a low mass construction for increased performance control.

Figure 9:
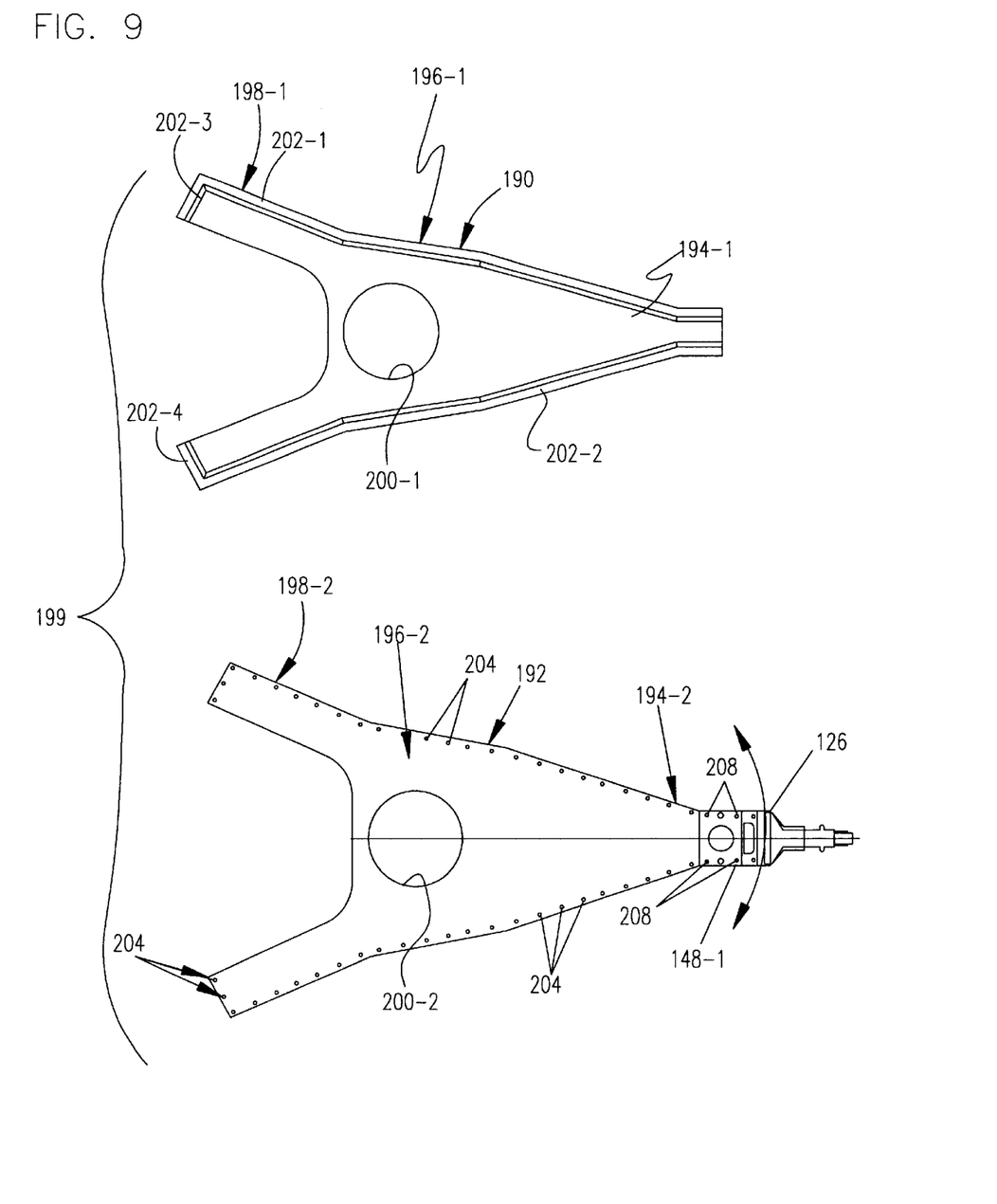
FIG. 9 illustrates an embodiment of a composite plate structure for the actuator assembly of FIG. 5.

In the illustrated embodiment of FIG. 9, the actuator embodiment shown is formed of composite plates 190, 192 including arm portions 194-1, 194-2, body portions 196-1, 196-2 and yoke portions 198-1, 198-2. Plates 190, 192 are assembled to form a composite plate assembly illustrated by bracket 199 in FIG. 9 so that yoke portions 198-1, 198-2 on plates 190, 192 form yoke arms 174, 176, body portions 196-1, 196-2 on plates 190, 192 form actuator body 164 and arm portions 194-1, 194-2 on plates 190, 192 form actuator arm 168 having multiple structural layers formed by plates 190, 192. Openings 200-1, 200-2 on plates 190, 192 cooperatively form bearing bore 170 of actuator body 164.

In the embodiment shown, plate 190 includes raised rim portions 202-1, 202-2, 202-3, 202-4 extending along opposed sides of plate 190 and end edges of yoke portions to form the support interface between plates 190, 192 to form a hollow space therebetween to reduce the operating mass of the actuator. As shown in FIG. 9, rim portions 202 of plate 190 are spot welded to plate 192 at spaced locations as illustrated by 204. Raised rim portions 202 are formed on plate 190 by known manufacturing techniques such as by punching or forming edge surfaces of the plate 190. In the embodiment shown, plates 190, 192 are formed of the same dimension. Rim portions 202 are formed on edge portions of plate 190 so that an outer profile dimension of plate 190 is smaller than plate 192 to form a perimeter ledge surface 206 on the multiple layered structure as shown in FIGS. 5–8. Although, FIGS. 5–8 illustrate a particular interface including a ledge surface 206, application of the present invention is not limited to the particular illustrative embodiment shown.

Thus, the multiple plate structure described forms a multiple plate actuator arm 168 adapted to support a head suspension assembly to reduce the mass of the arm structure without comprising lateral stiffness or resonance mode frequencies. In the embodiment shown, plates 190, 192 are separated by a hollow space. Alternatively, plates 190, 192 can be separated by a lightweight interface material which provides a lightweight construction for operation.

As previously described, prior integral solid actuator block structures were previously formed of a lightweight material such as aluminum while suspension assemblies are typically formed of a stainless steel material. As previously described with reference to FIG. 4, suspension assemblies 126 were typically staked to an actuator arm 124 to connect suspension assembly 126 to the actuator block 112. The staking process can introduce variations in the pre-load force supplied by the suspension assembly 126 to the head 108 which can affect fly height or operating characteristics of the head. The illustrated actuator of the present invention can be formed of a heavier material such as a stainless steel material while maintaining an overall low mass structure for operation within desired operating parameters. Thus, the head suspension assembly 126 formed of stainless steel can be spot welded to the multiple plate actuator arm 168 for read-write operations. In the embodiment shown in FIG. 9, suspension assembly 126 is spot welded at spaced locations 208 to plate 192. Alternatively, suspension assemblies can be welded or similarly connected to plate 190.

Figure 10:
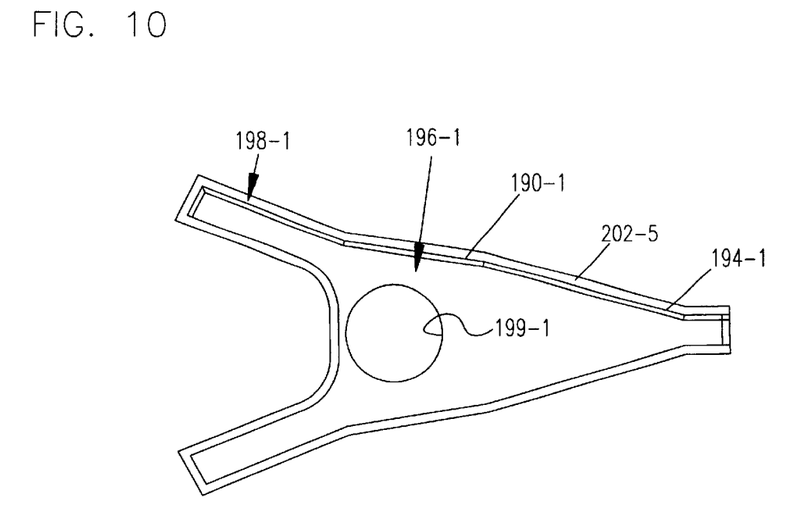
FIG. 10 is an alternate embodiment of a composite plate structure for an actuator assembly of the present invention.
Figure 11:
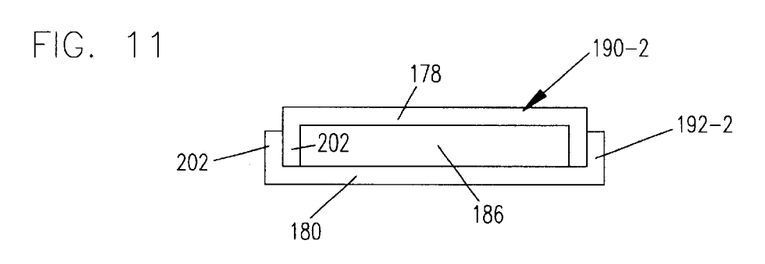
FIGS. 11–12 illustrate alternate embodiments of composite plate structures for an actuator assembly of the present invention.
Figure 12:
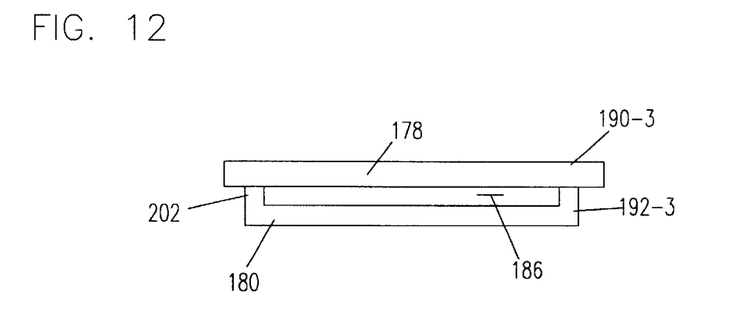

FIG. 10 illustrates an alternate embodiment for plate 190-1 including a raised rim 202-5 extending about an entire perimeter of plate 190-1 to form an interface structure supporting the plates 190-1, 192 in spaced relation. Alternatively, as illustrated in FIGS. 11–12, both plates 190-2, 192-2 include a raised rim 202 or in an alternative embodiment, only plate 192-3 as shown includes a raised rim 202 to form an interface structure between plates 190-3, 192-3 and application of the present invention is not limited to the specific embodiments shown.

FIGS. 13–16 illustrate an actuator 210 including a plurality of actuator arms 212-1, 212-2, 212-3 adapted to rigidly support a plurality of suspension assemblies 124 relative to multiple discs 104 in a disc stack 102. As shown, arms 212,-1, 212-2, 212-3 extend from an actuator body 214 including a bore 218 to rotationally connect actuator 210 to the base chassis 105. Yoke arms 220, 222 extends from the actuator body 214 to support a coil for operation of the voice coil motor 116. In the embodiment shown, the actuator 210 includes a plurality of composite plate assemblies 224-1, 224-2, 224-3 separated by spacers 226-1, 226-2.

Figure 13:
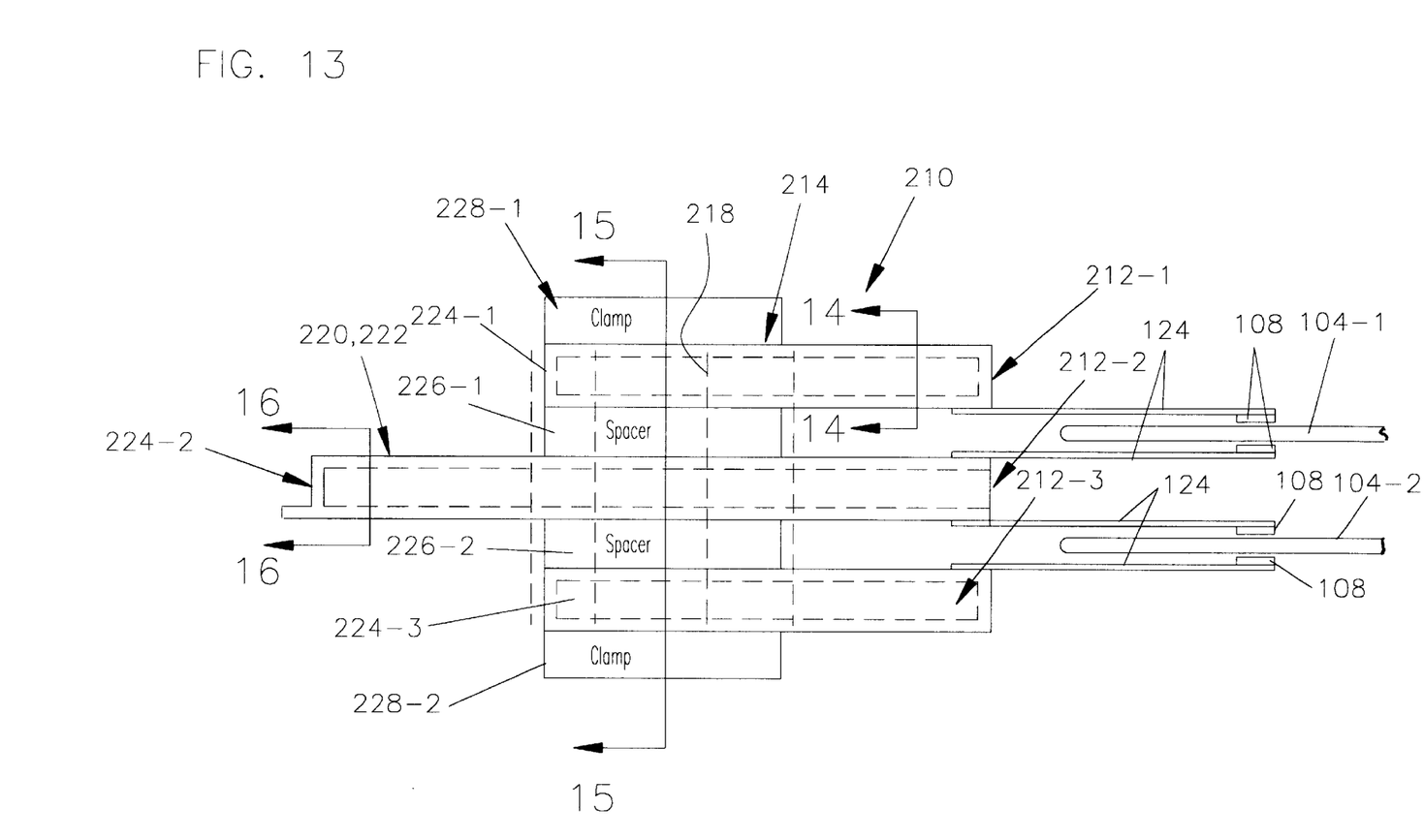
FIG. 13 illustrates an embodiment of an actuator having multiple stacked actuator arms including multiple arm plates supported in spaced relation to form a low mass actuator assembly of the present invention.
Figure 14:
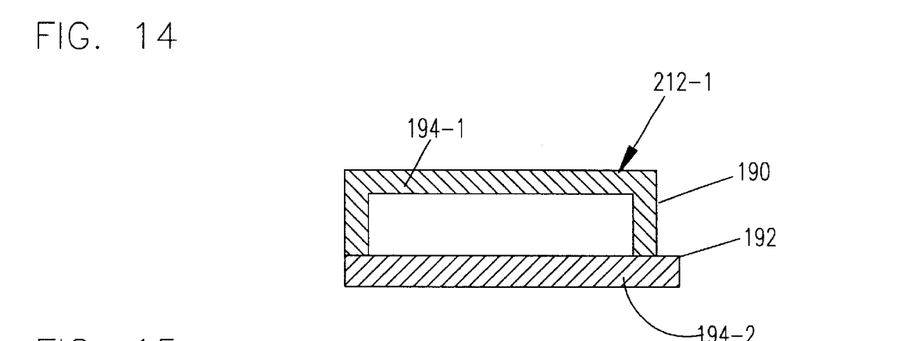
FIG. 14 is a cross-sectional view taken along line 14—14 of FIG. 13.
Figure 15:
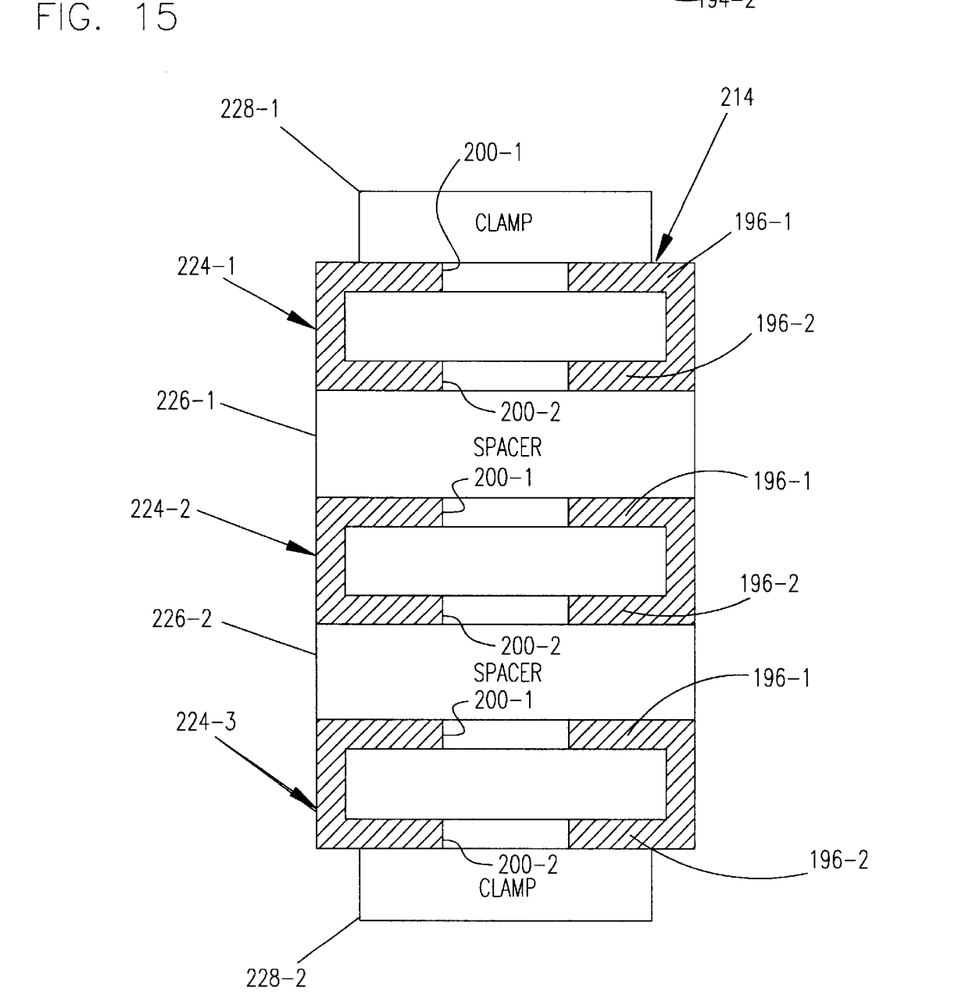
FIG. 15 is a cross-sectional view taken along line 15—15 of FIG. 13.
Figure 16:
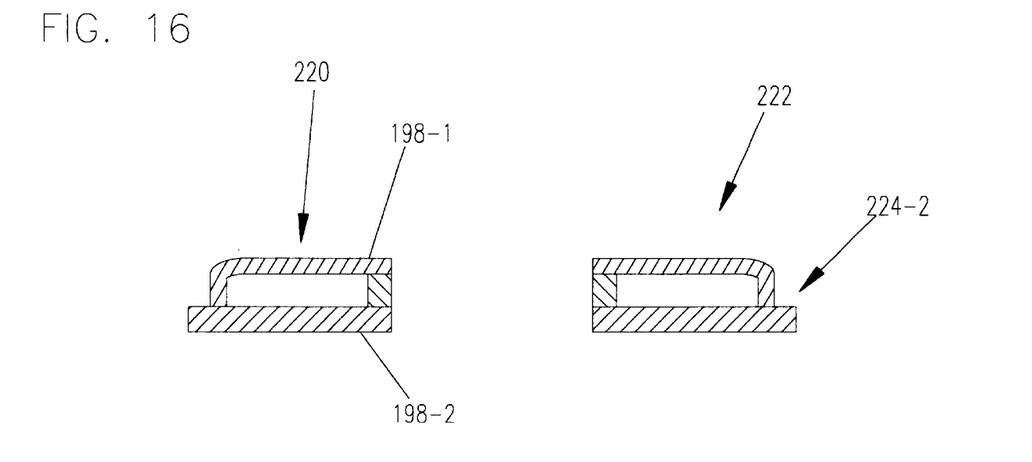
FIG. 16 is a cross-sectional view taken along line 16—16 of FIG. 13.

The composite plate assemblies 224-1, 224-2, 224-3 include multiple composite plates to form a multiple layered construction as previously described. The composite plate assemblies 224-1, 224-2, 224-3 include body portions 196-1, 196-2 and arm portions 194-1, 194-2. Arm portions 194-1, 194-2 of assemblies 224-1, 224-2, 224-3 form spaced actuator arms 212-1, 212-2, 212-3 as shown in FIG. 14. Body portions 196-1, 196-2 of assemblies 224-1, 224-2 and 224-3 and spacers 226-1, 226-2 form a multi-tiered actuator body 214 structure as illustrated in FIG. 15. In the embodiment shown, composite plate assembly 224-2 includes yoke arm portions 198-1, 198-2 to form yoke arms 220, 222 as illustrated in FIG. 16. Composite plate assemblies 224-1, 224-2, 224-3 are secured between clamps 228-1, 228-2 illustrated diagrammatically in FIGS. 13 and 15 to form the actuator 210.

Thus, as described, actuator arms 212-1, 212-2, 212-3 are adaptable for low mass construction having sufficient thickness for desirable resonance mode vibration, and the multi-tiered structure of the actuator body 214 provides a lower mass structure. Spacers 226-1, 226-2 can be formed of a low mass or lightweight material or alternative "hollow" structure. Spacers 226-1, 226-2 include a central opening (not shown) which is aligned with openings 199 of composite plate assemblies 224-1, 224-2, 224-3 to form bore 218 to rotationally connect the actuator body 214 to the base chassis 105. Clamps 228-1, 228-2 interface with bore 218 to secure the actuator assembly.

As described, prior head suspension assemblies of stainless steel were staked to actuator arms formed of a low weight material such as aluminum. The low mass design of the present invention can be formed of a stainless steel material and suspension assemblies can be spot welded as shown to coupled the head suspension assemblies to the actuator arms without compromising operating parameters. Although FIGS. 13 and 15 illustrate an actuator 210 including three actuator arms 212 including three composite plate assemblies, application is not limited to an actuator structure with a specific number of actuator arms.

Alternately stated, one embodiment of the present invention takes the form of an actuator (such as 160, 210) for supporting flexible head suspension assemblies 126 to read data from or write data to discs 104. The actuator includes an actuator body (such as 164, 214) adapted to be rotationally coupled relative to a base chassis 105 of a disc drive 100 and a yoke assembly including yoke arms (such as 174, 176, 220, 222) extending from the actuator body (such as 164, 214). The actuator includes at least one rigid actuator arm (such as 168, 212) rigidly supporting the flexible head suspension assemblies 126. The at least one rigid actuator arm (such as 168, 212) includes multiple arm plates (such as 178, 180) supported in spaced relation to form a low mass assembly having sufficient arm thickness for lateral stiffness.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the illustrated embodiments are directed to a magnetic disc drive system, it will be appreciated by those skilled in the art that the teachings of the present invention can be applied to other systems, like optical systems, without departing from the scope and spirit of the present invention.

What is claimed is:

1. An actuator adapted to support a head suspension assembly for a data storage device comprising:
   an actuator body adapted to be rotationally coupled relative to a base chassis of the data storage device;
   a yoke assembly including spaced yoke arms extending from the actuator body; and
   at least one relatively rigid actuator arm having an elongate length and opposed sides extending from the actuator body and adapted to have the head suspension assembly coupled thereto, the at least one relatively rigid actuator arm including multiple arm plates supported in spaced relation to form a void space between the arm plates and defining a thickness of the at least one relatively rigid actuator arm and including elongated rim portions extending along the opposed sides of the at least one relatively rigid actuator arm to form edge surfaces between the spaced arm plates.

2. The actuator of claim 1 in which the multiple arm plates of the at least one actuator arm are formed of a stainless steel material.

3. The actuator of claim 1 and further comprising:
   a head suspension assembly welded to the at least one relatively rigid actuator arm.

4. A disc drive having the actuator of claim 1 rotationally coupled to the base chassis to support at least one head to read or write data to a data storage disc or media.

5. The actuator of claim 1 and including a plurality of spaced relatively rigid actuator arms and the multiple spaced arm plates forming a plurality of arm plate assemblies separated by spacers.

6. The actuator of claim 1 in which the actuator body includes multiple spaced body plates supported in spaced relation.

7. The actuator of claim 6 in which the multiple spaced body plates are supported by an interface structure to form a hollow space between the multiple spaced body plates.

8. The actuator of claim 1 in which the spaced yoke arms include multiple spaced yoke plates.

9. The actuator of claim 8 wherein the multiple spaced yoke plates are supported by an interface structure to form a hollow space between the multiple spaced yoke plates.

10. An actuator adapted to support a head suspension assembly for a data storage device comprising:
    an actuator body adapted to be rotationally coupled relative to a base chassis;
    a yoke assembly including spaced yoke arms extending from the actuator body; and at least one actuator arm having an elongate length extending from the actuator body and the actuator body including a plurality of plates including body portions and arm portions supported in spaced relation to form the actuator body and the at least one actuator arm of the actuator.

11. The actuator of claim 10 in which the plurality of plates are welded to form the actuator body and the at least one actuator arm of the actuator.

12. The actuator of claim 10 in which at least one of the plates of the plurality of plates includes a raised rim forming an interface structure between the plurality of plates and a hollow space therebetween.

13. The actuator of claim 10 wherein the actuator includes a plurality of actuator arms formed of a plurality of plate assemblies and each of the plurality of plate assemblies including first and second plates having arm portions and supported in spaced relation to form the plurality of plate assemblies of the actuator.

14. The actuator of claim 13 including at least one spacer between the plurality of plate assemblies and a multi tiered actuator body structure formed of the at least one spacer and the body portions of the plurality of plates.

15. The actuator or claim 14 in which the actuator includes at least three actuator arms formed by at least three plate assemblies and at least two spacers separating the at least three plate assemblies.

16. The actuator of claim 13 wherein the plurality of plate assemblies are separated by spacers.

17. The actuator of claim 13 wherein the plurality of plate assemblies include a yoke portion to form the yoke arms of the yoke assembly.

18. The actuator of claim 13 wherein the plurality of plate assemblies are secured by a clamp assembly.

19. The actuator of claim 10 wherein the plurality of plates are formed of a stainless steel material.

20. A disc drive having the actuator of claim 10 rotationally coupled to the base chassis to support at least one head to read or write data to a data storage disc or media.

21. The actuator of claim 10 wherein the plurality of plates include a yoke portion to form the spaced yoke arms of the yoke assembly.

22. The actuator of claim 10 wherein the body portions of the plurality of plates includes an opening for a bearing cartridge.

23. The actuator of claim 10 wherein the spaced separation of the plurality of plates forms a void space between the body portions and the arm portions of the plurality of plates.

24. The actuator of claim 10 including rim portions extending along at least one of the plurality of plates to form the spaced separation therebetween.

* * * * *

UNITED STATES PATENT AND TRADEMARK OFFICE
CERTIFICATE OF CORRECTION

PATENT NO. : 6,687,094 B2
DATED : February 3, 2004
INVENTOR(S) : Xiong Liu et al.

It is certified that error appears in the above-identified patent and that said Letters Patent is hereby corrected as shown below:

<u>Title page,</u>
Item [73], Assignee, change "Scots" to -- Scotts --.

Signed and Sealed this

Twentieth Day of April, 2004

JON W. DUDAS
*Acting Director of the United States Patent and Trademark Office*